June 5, 1934.　　　　C. A. KUNKEL　　　　1,961,499
DEVICE FOR GROOVING TIRES
Filed Feb. 14, 1933　　　2 Sheets-Sheet 1

Inventor
Charles A. Kunkel

Attorneys

June 5, 1934.  C. A. KUNKEL  1,961,499
DEVICE FOR GROOVING TIRES
Filed Feb. 14, 1933  2 Sheets-Sheet 2
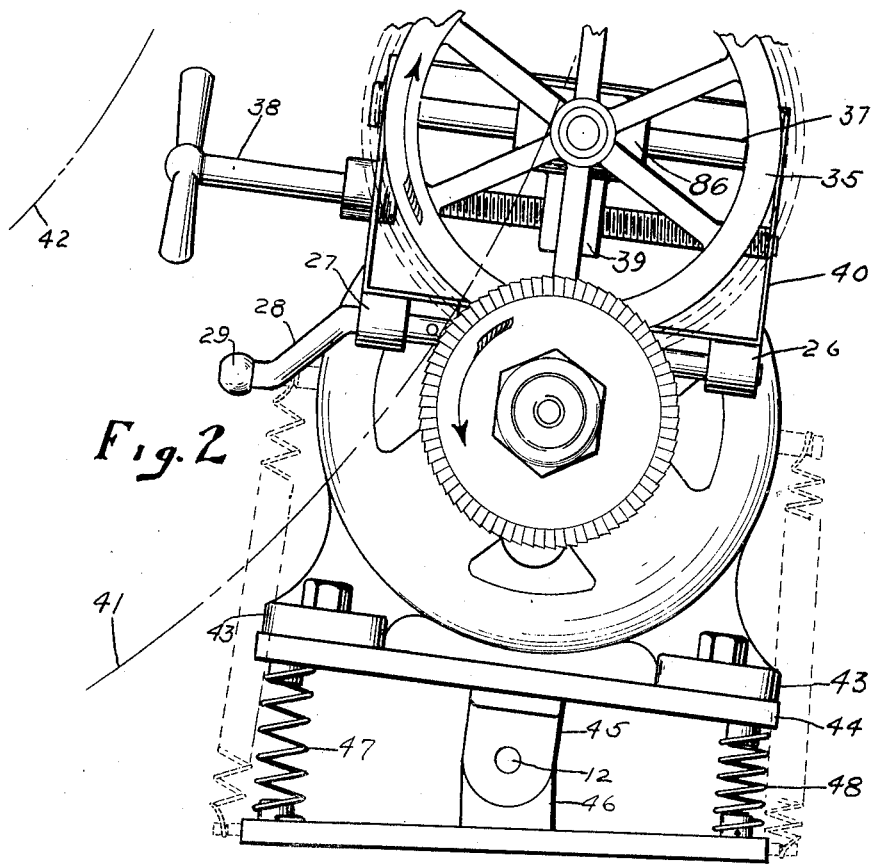
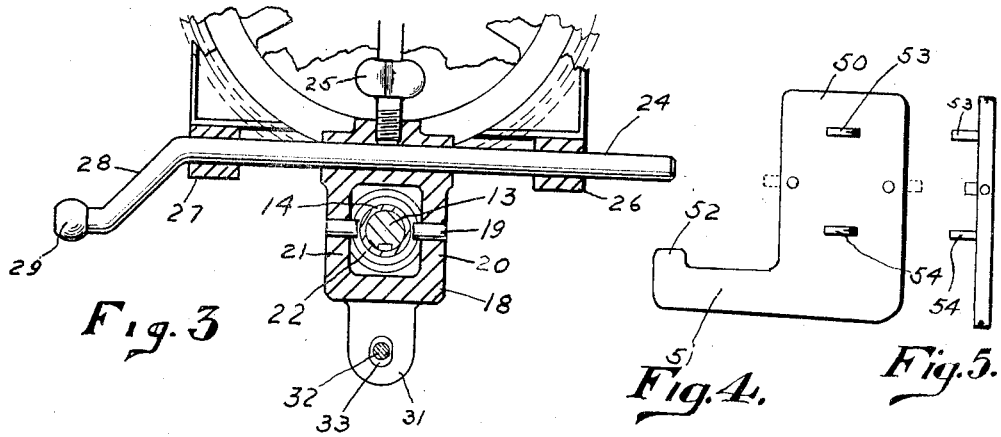
Inventor
Charles A. Kunkel
By Murray Fitzgelter
Attorneys Patented June 5, 1934

1,961,499

UNITED STATES PATENT OFFICE 1,961,499

DEVICE FOR GROOVING TIRES

Charles A. Kunkel, Cincinnati, Ohio

Application February 14, 1933, Serial No. 656,701

2 Claims. (Cl. 99—20)

After automobile tires, particularly of the pneumatic type, have been used for a period of time, the treads are worn to such extent that a substantially smooth surface is presented to a roadway. One of the purposes in providing treads having grooves and the like is to counteract tendency toward skidding and to give greater frictional contact of the tire with a roadway. After the original grooved tread of an automobile tire has been worn away, there ordinarily remains a sufficient mass of rubber to warrant the continued use of the tire for a considerable period of time. During such continued period of use, there is always the added hazard of increased slipping or skidding tendency.

An object of this invention is to provide means for forming one or more grooves in such worn tires or tire casings so as to again obtain anti-slipping or anti-skidding characteristics that were lost coincident with the wearing away of the original tread.

Another object of the invention is to provide a simple and efficient device for performing the indicated work.

Another object of the invention is to provide a device for the purpose indicated that may perform its intended work upon a tire or casing while mounted upon an automobile.

Another object of the invention is to provide a device that will readily adapt itself to slight misalignments that may develop in wheels whereby to provide even and regular development of grooves upon or in the tire casing.

Another object of the invention is to provide a device for the purpose indicated that will automatically adjust itself to the changing condition of the tire coincident to the forming of grooves therein.

These and other objects are attained by the means described herein and disclosed in the accompanying drawings, in which:

Fig. 2 is a side elevation of the device shown in Fig. 1, and showing to some degree the self-adjustment of the device when in operation.

Fig. 3 is a sectional view on line 3—3 of Fig. 1.

Figs. 4-5 show, on a reduced scale, a modified form of base plate that may form a detail of the invention.

Figure 1:
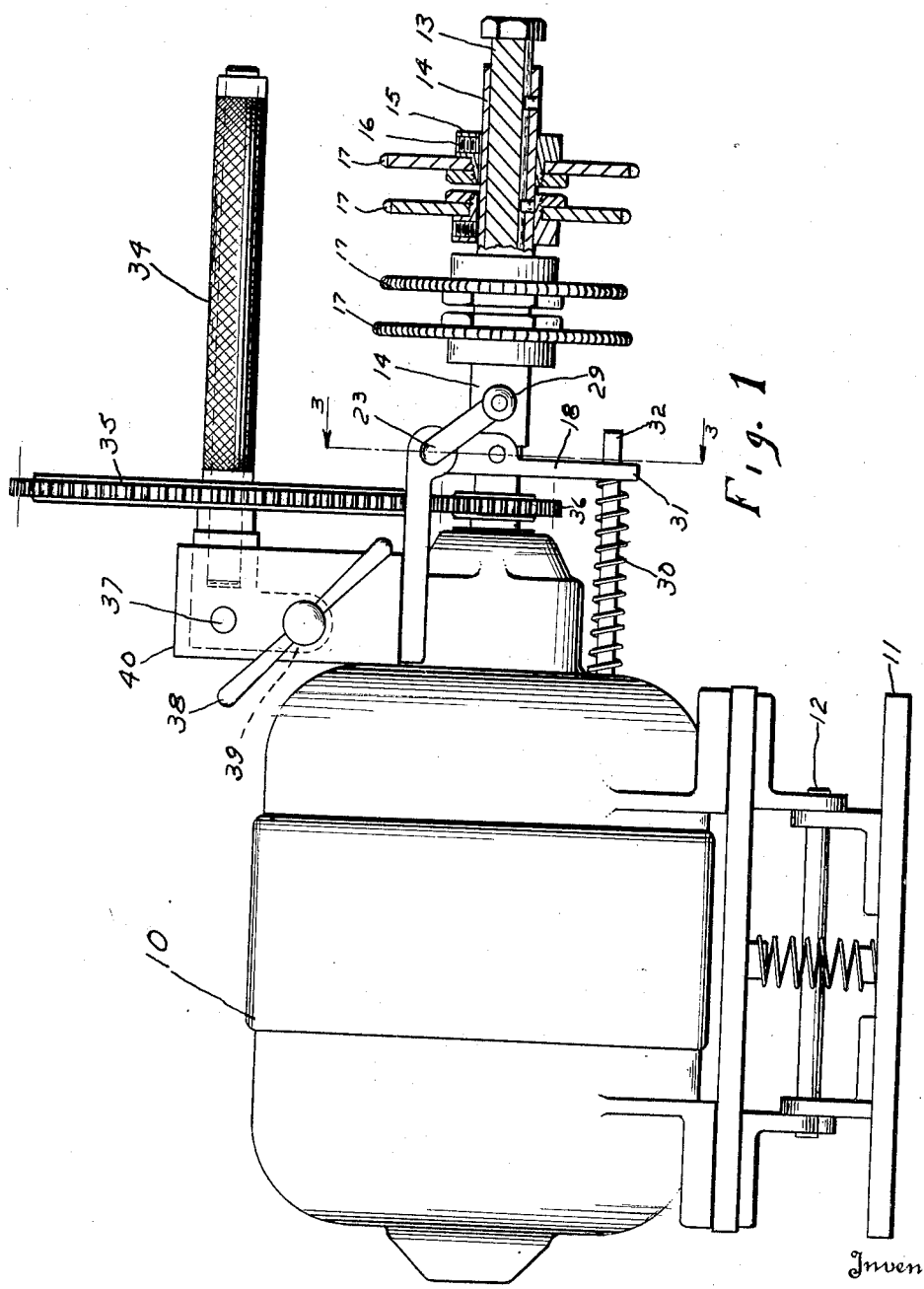
Fig. 1 is a view in front elevation showing a device embodying the invention.

The motor 10 is supported above a suitable base plate 11 in any suitable manner so that the motor together with the mechanisms associated therewith may tilt about an axis 12 substantially parallel with the axis of the motor shaft 13. The motor shaft is preferably extended as is evident in Fig. 1 or it may comprise a suitable addition for providing a part corresponding to the extension 13.

Upon the shaft 13 is mounted a sleeve 14 that is splined to the shaft 13. Upon the sleeve 14 are mounted suitable collars 15 that may be adjusted longitudinally of the sleeve 14 and be secured in adjusted positions by any suitable means, for example, as set screw 16. The collars carry suitable circular cutters 17. The cutters 17 may be varied in number and may be given various spacings as well as being of various contours as may be required in view of the particular tire casings to be operated upon.

The sleeve 14 is pivotally connected to a bell crank lever 18 by means of pins 19 extending through the opposed walls 20 and 21 of the bell crank lever and extend into a circumferential groove formed in the sleeve 14 whereby the sleeve 14 must respond to any movement of the bell crank lever about the axis 23 of the bell crank lever. The bell crank lever 18 is secured upon the shaft 24 by means of a wing nut 25 having threaded connection in a suitable bore provided in a part of the bell crank lever and bearing upon the shaft 24. The shaft 24 is received in suitable brackets 26 and 27 that may form part of the motor housing or may comprise part of a suitable attachment to the motor housing. The forward end of the shaft 24 is offset by means of the angular portion 28 thereof and a suitable contact head 29 is formed on the offset portion for contact with the side of a tire or casing that is being operated upon by the device. It is intended that the head 29 shall remain in contact with the side wall of the casing and thereby cause a shifting of the cutters in conformity with any slight misalignment or variation from true of the tire casing while rotated during the operation of the apparatus. In order to retain the head 29 in contact with the wall of the tire casing, a coiled spring 30 is provided for yieldingly urging the lower arm 31 of the bell crank lever toward the cutters 17 and consequently urging the head 29 toward a tire casing when subjected to the device. The coiled spring 30 is received about a suitable guide stem 32 that may be mounted on the motor housing or in any manner held in a substantially stationary position, and the outer or free end of the stem 32 extends through an aperture 33 in the depending arm 31 of the bell crank lever. The coil spring 30 has its opposite ends in abutment upon the motor housing and the inner face of the arm 31.

It is intended that the motor 10 shall revolve the tire casing while the cutters 17 groove the casing. For this purpose a friction shaft 34 is positioned above the motor shaft 13 and is driven from the motor shaft by means of suitable gears 35 and 36. The gear 35 and the friction shaft 34 are supported on a sliding bearing 36 supported upon a suitable shaft 37. The sliding bearing 86 may be adjusted along the shaft 37 by means of a hand screw 38 having the threaded portion thereof in threaded engagement with a depending lug 39 on the bearing 36. The hand screw 38 may be suitably mounted in a supporting frame 40 so as to prevent longitudinal movement of screw 38. The frame 40 may be mounted upon a motor housing in any suitable manner. As illustrated herein, the bearings 26 and 27 in the shaft 28 are carried by the frame 40. Ordinarily, there would be but little occasion to adjust the friction shaft 34 along the shaft 37; however, it is to be understood that if any appreciable degree of adjustment of that character should be desired, suitable compensation therefor must be provided in the gearing for driving the friction shaft 34 from the motor shaft 13. The shaft 37 is supported by the frame 40.

Be reference to Fig. 2, the position that a tire would take during the time that the device operates thereon is indicated by the lines 41 and 42. The line 41 indicates the outer circumference of a casing and the line 42 indicates approximately the inner edge of the casing or wheel felloe.

In the exemplification of the invention in Fig. 2, the motor 10 conforming to the general type or character of commercial motors has its feet 43 secured to a support plate 44. The support plate is provided with depending lugs 45 that are pivotally supported upon the shaft 12. The shaft 12 in turn is supported by lugs 46 formed upon the base 11. Springs 47 and 48 are interposed between the plates 11 and 44 and are intended to substantially equalize one another whereby to normally retain the motor and cutting apparatus in a balanced position upon the shaft 12. A mounting of the character indicated is intended to permit the yielding movement of the cutting apparatus and the frictional contact shaft 34 by reason of contact thereof with a tire casing. The springs also yieldingly urge the device into proper operating or working relation to the work or tire being operated upon.

The base plate illustrated in Figs. 4–5 is intended to be an alternative form of the base plate 11. The arm or elongation 51 is formed upon the plate 50 for cooperation with a lug or finger 52 for providing a seat for a jack by means of which the automobile wheel may be raised from the ground so that upon operation of the motor 10, the friction shaft 34 on contacting with the tire, will revolve the tire. Shaft 34 moves in the direction indicated by the arrow upon gear 35. The cutters move in a direction opposite to that followed by the tire, as indicated by the arrow upon one of the cutters 17 in Fig. 2. When plate 50 is used in lieu of the plate 11, the lugs 53 and 54 receive a shaft such as shaft 12. If desired, the compression springs such as 47 and 48 may be superseded with tension springs extending between lugs formed on the base 10 and upon a motor housing, as indicated in dotted lines. In some types of motor constructions, it will be unnecessary to provide a plate such as 44, and lugs corresponding to the lugs 45 may be formed directly upon the motor housing.

Various other modifications in the device will readily suggest themselves in view of specific circumstances and conditions that exist in the art for which this device is intended, wherefore the disclosure herein is to be understood as merely exemplary of one form in which the invention may be embodied.

In the operation of the device, an automobile wheel would be elevated from the ground by means of a suitable jack or lifting device. The apparatus would then be moved into such position that the cutter 17 and the friction shaft 34 would have contact with a tread portion or periphery of the tire casing. It is to be understood that the vehicle wheel would be released so that it would be free to revolve. In positioning the apparatus adjacent the tire, the inner side face of the casing would be brought into contact with the head 29. The motor 10 would then be energized by completing an electrical circuit embracing the same. As the motor revolves, it serves both to rotate the tire casing against the cutters 17 wherefore after a few revolutions of the tire casing, the cutters will have performed their necessary cutting function and the motor may be shut off and the apparatus withdrawn from proximity with the tire casing. The same operation would be performed on each of the tires that would require scoring or grooving.

Although the drawings do not disclose an electrical circuit, it is to be understood that suitable electrical service connection is to be provided for the motor 10 and that an electrical switch shall be readily available so that an operator may render the motor operative and inoperative at will while observing the operation of the device on the tire.

Although the tool for working on a tire is shown herein as a gang of rotary cutters, it is to be understood that tools of other type may be used, dependent upon the character of work that is to be performed.

What is claimed is:

1. In a device of the class described the combination of a base, a power actuated drive shaft tiltably supported above the base, cutter means splined upon the drive shaft and adapted for movement along the shaft, a tire moving means operated from the drive shaft for moving a tire along the cutter means, gauge means for contacting the side of a tire and having connection with the cutter means for actuating the cutter means along the drive shaft in conformity with lateral movement of a tire while the tire is being worked upon by the cutting means, and yielding connecting means between the base and the drive shaft for automatically retaining the cutter means and the tire moving means in contact with a tire.

2. A device for grooving peripheral surfaces of mounted, freely rotatable tires comprising a base, an electric motor pivotally supported above the base and having its rotor shaft extending in parallelism with the pivotal mounting of the motor upon the base, spring means balancing the motor upon the base and yieldingly permitting movement of the base back and forth about the pivotal mounting of the motor on the base, said motor including a housing, a sleeve splined upon the rotor shaft, cutter means mounted upon the sleeve and secured thereto for movement as a unit with the sleeve, a frame supported by the motor housing, a bearing shaft supported by the frame, a bearing slidable along the bearing shaft, a friction shaft rotatably supported by the bearing and having its axis in parallelism with the axis of the rotor shaft, drive means connecting the rotor shaft and the friction shaft for imparting rotatory motion to said shafts in opposite directions, means for adjusting the bearing along the bearing shaft, a bell crank lever pivotally supported by the frame and having connection with the sleeve on the rotor shaft whereby movement of the bell crank lever about its pivotal mounting actuates the sleeve longitudinally of the rotor shaft, and means yieldingly urging one of the arms of the bell crank lever in such direction as tends to move the sleeve and cutter means outwardly of the rotor shaft, and the second arm of the bell crank lever being adapted to contact the side face of a tire having its peripheral surface in contact with the cutting means and the friction shaft whereby lateral sway of a tire relative the friction shaft actuates the cutter means along the rotor shaft to a degree corresponding to the lateral sway of such tire.

CHARLES A. KUNKEL.